US007224830B2

(12) United States Patent
Nefian et al.

(10) Patent No.: US 7,224,830 B2
(45) Date of Patent: May 29, 2007

(54) GESTURE DETECTION FROM DIGITAL VIDEO IMAGES

(75) Inventors: Ara V. Nefian, Fremont, CA (US); Robert D. Cavin, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 793 days.

(21) Appl. No.: 10/358,761

(22) Filed: Feb. 4, 2003

(65) Prior Publication Data

US 2004/0151366 A1 Aug. 5, 2004

(51) Int. Cl.
*G06K 9/00* (2006.01)
*H04N 13/00* (2006.01)

(52) U.S. Cl. .................. 382/154; 382/285; 715/863; 348/42

(58) Field of Classification Search ............... 382/154, 382/285; 715/863; 348/42–60
See application file for complete search history.

(56) References Cited

U.S. PATENT DOCUMENTS

| 6,256,033 | B1 | 7/2001 | Nguyen | ............... | 345/358 |
| 6,526,161 | B1* | 2/2003 | Yan | ............... | 382/118 |
| 6,674,877 | B1* | 1/2004 | Jojic et al. | ............... | 382/103 |
| 6,788,809 | B1* | 9/2004 | Grzeszczuk et al. | ........ | 382/154 |
| 2002/0041327 | A1* | 4/2002 | Hildreth et al. | ............... | 348/42 |
| 2003/0113018 | A1* | 6/2003 | Nefian et al. | ............... | 382/181 |

OTHER PUBLICATIONS

*Dynamic Gesture Recognition SDK, Insights*; http://www.ptgrey.com/newsletters/oct2001.html; Oct. 2001; pp. 1-3.

Lee W. Campbell, David A. Becker, Ali Azarbayejani, Aaron F. Bobick and Alex Pentland; *Invarient Features for 3-D Gesture Recognition*; International Conference on Automatic Face & Gesture Recognition; pp. 157-162; 1996.

Andrew D. Wilson and Aaron F. Bobick; *Parametric Hidden Markov Models for Gesture Recognition*; IEEE Transaction Pattern Analysis and Machine Intelligence, vol. 21, No. 9; pp. 884-900; Sep. 1999.

Ara V. Nefian, Radek Grzeszczuk and Victor Eruhimov; *A Statistical Upper Body Model for 3D Static and Dynamic Gesture Recognition from Stereo Sequences*; IEEE International Conference on Image Processing, vol. 3; pp. 286-289; 2001.

Christopher Wren, Ali Azarbayejani, Trevor Darrell, and Alex Pentland; Pfinder: *Real-Time Tracking of the Human Body*; IEEE Transactions on Pattern Analysis and Machine Intelligence, vol. 19, No. 7; [HTML version submitted]; pp. 780-785; Jul. 1997.

B. Stenger, P.R.S. Mendonça and R. Cipolla; *Model-Based Hand Tracking Using an Unscented Dalman Filter*, Proc. British Machine Vision Conference, vol. 1; pp. 63-72; Sep. 2001; Manchester, UK.

* cited by examiner

*Primary Examiner*—Ishrat Sherali
*Assistant Examiner*—Aaron Carter
(74) *Attorney, Agent, or Firm*—Trop, Pruner & Hu, P.C.

(57) ABSTRACT

Human gestures are detected and/or tracked from a pair of digital video images. The pair of images may be used to provide a set of observation vectors that provide a three dimensional position of a subject's upper body. The likelihood of each observation vector representing an upper body component may be determined. Initialization of the model for detecting and tracking gestures may include a set of assumptions regarding the initial position of the subject in a set of foreground observation vectors.

17 Claims, 4 Drawing Sheets

GESTURE DETECTION FROM DIGITAL VIDEO IMAGES

BACKGROUND

This invention relates generally to motion capture technology, and more specifically to human body segmentation, tracking, and gesture recognition by use of digital video image data.

Motion capture technology refers generally to the science of tracking human movement in real time. Digitized human figure motion may be used to drive computer graphic characters. Processor based systems may detect and track human gestures or upper body features using digitized video image data. Applications for detecting and tracking human gestures or upper body features include human computer interfaces, human sign language understanding, industrial control, and entertainment devices such as virtual reality or interactive games. Digitized video image data also may provide input to a processor-based system to perform other functions or services.

In the past, motion capture technology could track a person who was outfitted with sensors. For example, data gloves or other external devices may be attached to the human body to track movements such as hand gestures in a variety of applications. The use of sensors attached to a person have a number of clear disadvantages including discomfort and delay to set up and attach the device to the person.

Increasingly, digital cameras and vision systems have been proposed and used for human gesture recognition. However, before digital video image data may be fully and practically used to detect and track human gestures and movement of the upper body, there are a number of other problems and difficulties that must be addressed. One problem is that a user-guided initialization has been required to identify one or more of a subject's features before any detecting and tracking commences, and this can be time and resource intensive. Another problem is that there exists inherent depth ambiguity when two dimensional images are used. For example, if the color of the subject's skin is used to detect and track gestures or movement of the face and/or hands, there still may be depth ambiguity resulting in errors in detecting and tracking. Other problems detecting and tracking gestures and upper body features are caused by variations in illumination, shadow effects, non-stationary backgrounds, partial occlusions and self-occlusions. For these reasons, there is a need for improved detection and tracking of human gestures and upper body movement using digital video image data.

DETAILED DESCRIPTION

Figure 1:
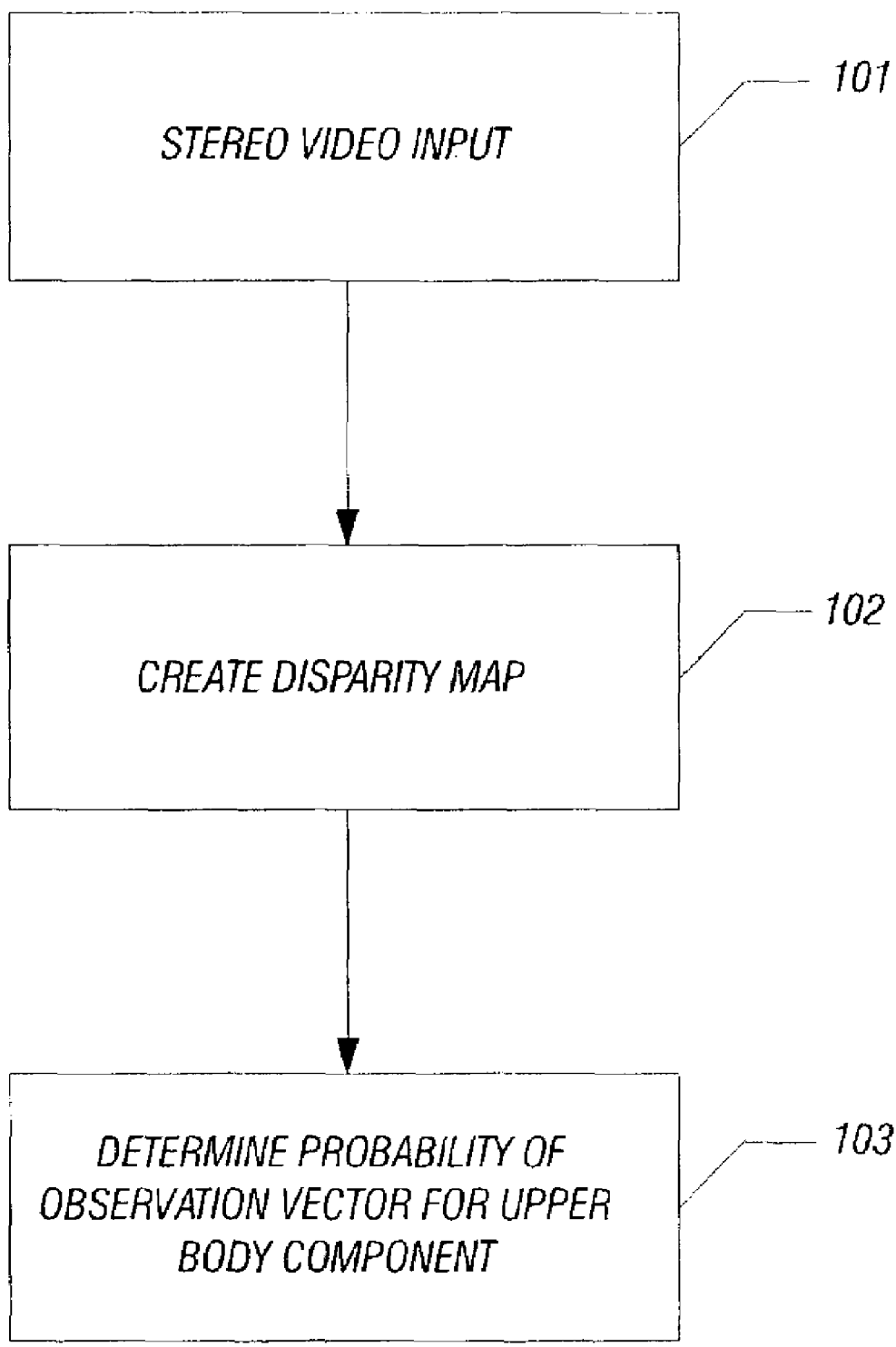
FIG. 1 is a block diagram of one embodiment of the invention for detecting gestures from stereo digital video images.

FIG. 1 is a block diagram representing one embodiment which may be used to detect and/or track gestures, movement or other features of the human upper body, head, or one or more appendages of a subject person. In one embodiment, a three dimensional statistical model may be used to segment and track the upper body from stereo sequences. Disparity maps obtained from stereo sequences may be used, together with colors, to identify and track the upper body components. As a result, the model may be used to track the upper body in varying illumination conditions.

In block 101, a stereo digital camera obtains a pair of digital video images in which a subject, i.e., a person, appears in the foreground. In one embodiment, the pair of images includes only a single subject in the foreground and at least some or all of the subject's upper body. However, the invention is not limited to detecting and tracking only one subject. Each image consists of a plurality of color pixels. Although in one embodiment a single stereo camera obtains a pair of images, multiple cameras also may be used to obtain two or more images at the same time. The use of two or more images allows a three dimensional image to be obtained with a disparity map.

In block 102, according to one embodiment, a disparity map is created for each pair of images. In general, a disparity map may be obtained by measuring the difference between image blocks at the same position in the pair of images. For example, if an image block appears in the first image at a different location than it appears in the second image, the disparity may be the measured difference between the two locations. An image block that appears in the second image ten pixels to the right of its location in the first image may be said to have a disparity ten pixels to the right. Generally, objects of shallow depth, i.e., closer to the foreground, exhibit more disparity than objects of greater depth, i.e., further from the foreground. By measuring the disparity associated with the stereo images, a disparity map may be constructed. A disparity map provides three dimensional data from a pair of two dimensional images. In one embodiment, dense disparity maps may be used to reduce the inherent depth ambiguity present in two dimensional images and enable accurate segmentation under partial occlusions and self occlusions.

The disparity map may be used to create a set of observation vectors. In one embodiment, the three dimensional position of a pixel and its color may be represented as a set of observation vectors. Each observation vector $O_{ij}$ represents a pixel in row i and column j. The observation vector specifies the three dimensional position of a pixel from the disparity maps $O^d_{ij}=[O^d_{ij}(x), O^d_{ij}(y), O^d_{ij}(z)]$, which indicates the distance from the camera to the object in three dimensions, i.e., the x, y and z dimensions, and its color in the image space $O^c_{ij}$.

In block 103, the probability that an observation vector represents an upper body component may be determined. In one embodiment, the probability of each observation vector indicating a specific upper body component may be determined by using an upper body model including a Bayesian network. In general, a Bayesian network is based on the concept of conditional probability. The probability of one event is conditional on the probability of a previous one. In the upper body model, the probability of an observation vector indicating a specific upper body component is conditional on the probability of one or more other criteria, such as another upper body component or set of joints. These criteria are generally referred to as the nodes of a Bayesian network.

In one embodiment, the nodes of the network represent anthropological measures of the human body (M), the three dimensional position of the upper body joints (J), the parameters of the body components (S), the observation $O_{ij}$, and the component membership of each observation $q_{ij}$. The upper body components are C={T, He, $Ha_l$, $Ha_r$, $F_l$, $F_r$, $U_l$, $U_r$}, where T is the torso, He is the head, $Ha_l$ is the left hand, $Ha_r$ is the right hand, $F_l$ is the left forearm, $F_r$ is the right forearm, $U_l$ is the left upper arm, and $U_r$ is the right upper arm.

The J nodes represent the three dimensional position of the upper body joints such as the neck (N), the left ($S_l$) and right shoulders ($S_r$), elbows and the left ($W_l$) and right wrists ($W_r$). The three coordinates of a joint may be represented with the coordinates J(x), J(y) and J(z). The S nodes represent the parameters of the upper body components such as the torso (T), the head (He), the left ($U_l$) and right upper arms ($U_r$), the left ($F_l$) and right fore arms ($F_r$), and the left ($H_l$) and right hands ($H_r$). The dependency of the $O^d_{ij}$ from the model nodes depends on the value $q_{ij}$. With the appropriate values for each of the J, M nodes, the head network is used for the left and right hands, and the left forearm network is used in the modeling of the left and right upper arms as well as the right fore arm In one embodiment, the probability of an observation vector $O_{ij}$ may be calculated as follows:

$$P(O_{ij}) = \sum_{q_{ij} \in C} P(O_{ij}|q_{ij}) P(q_{ij})$$

where $P(q_{ij})$=const. for all $q_{ij} \in C$, and $$P(O_{ij}|q_{ij}) = \int_{J,S,M} P(O_{ij}|S, M, q_{ij}) P(S|J, M, \int q_{ij}) P(J|M) P(M) dJSM$$

The term $P(O_{ij}|S, M, q_{ij})$ describes the observation likelihood for each body component, and the term P(S, J, M|$q_{ij}$)=P(S, J, M|$q_{ij}$)P(J|M)P(M) describes the articulation constraint of the model.

In one embodiment, it may be assumed that the anthropological values of the nodes M do not change over time for the same person. In addition, it may be assumed that the values of M are known and constant across multiple subjects. This simplification increases significantly the speed of the segmentation, and also validates the assumption that P(M)=const. for all body measurements.

In one embodiment, $P(O^c_{ij}|q_{ij}, S)$ is described by a uniform distribution over the entire range of color hue values for the torso and arms, and is a Gaussian density function for the head and hand components.

In one embodiment, the color distribution and the three dimensional position of each pixel may be considered independent random variables, and with the general assumption $P(O^c_{ij}|q_{ij}, S, M) = P(O^c_{ij}|q_{ij}, S)$, the probability of the observation vectors $O_{ij}$ may be decomposed as $$P(O_{ij}|q_{ij}, S, M) = P(O^d_{ij}|q_{ij}, S, M) P(O^c_{ij}|q_{ij}, S)$$

In each frame, the best state assignment of a pixel or three dimensional observation vector may be determined. In other words, the likelihood is determined that a pixel has a state assignment to a specific body component. With the optimal state assignment for the pixels determined, two or more upper body components of the subject may be identified, gestures may be detected, and the subject's movement may be tracked over a sequence of images. As will be explained below, the upper body may be segmented into at least two and preferably three or more components.

Figure 2:
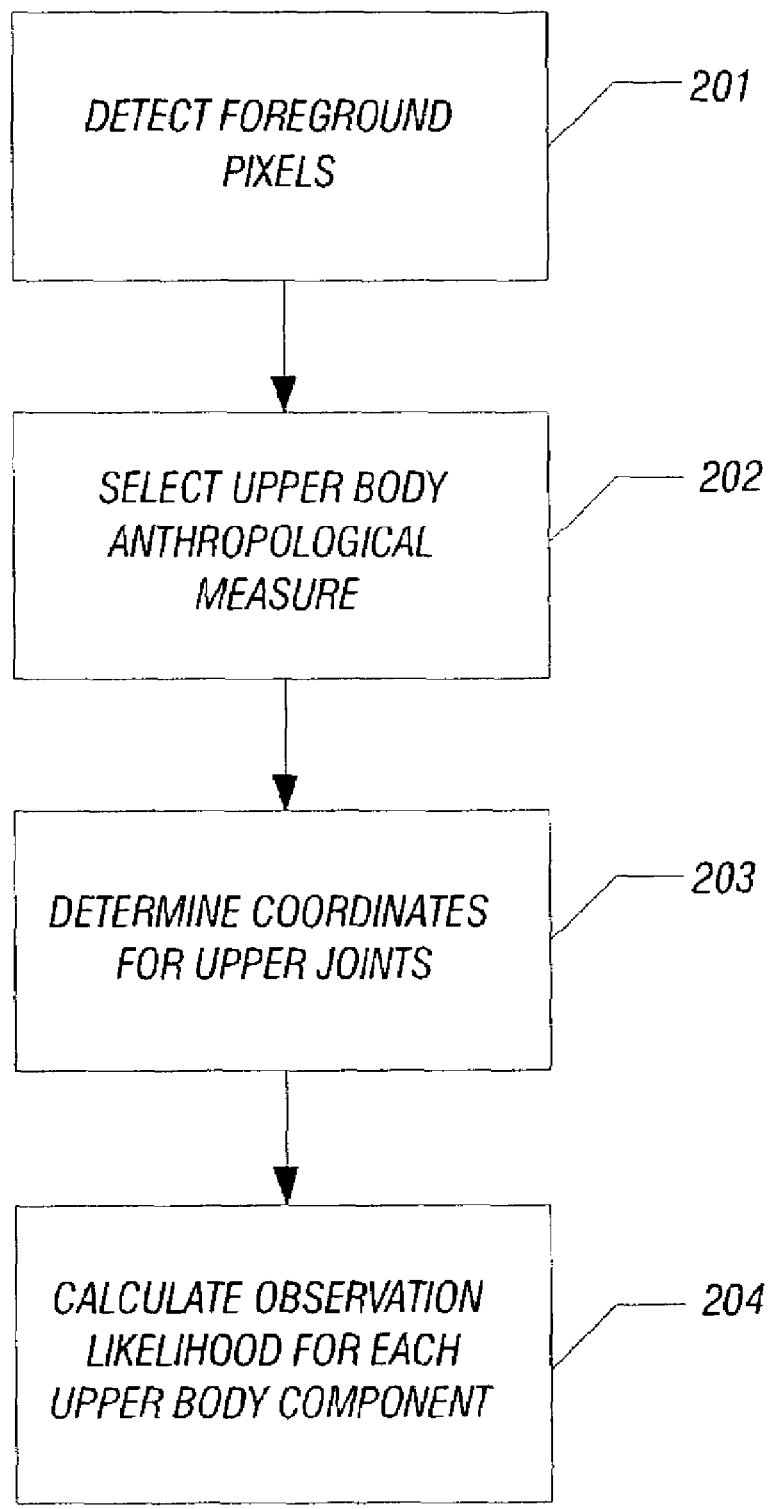
FIG. 2 is a block diagram showing a method for initializing the model and tracking upper body components according to one embodiment of the invention.

In the embodiment of FIG. 2, a set of assumptions regarding the relative position of the subject to the camera may be used to initialize the model. Following initialization, the model parameters may be tracked over consecutive frames.

According to one embodiment, in block 201, a set of foreground pixels may be detected from the observation vectors. The foreground observation vectors may be referred to as $O_F$ which represent those pixels in the image for which the information about their three dimensional position is available and that are closer to the camera than a fixed distance threshold. The threshold may be chosen in such a way that the foreground pixels consist mostly of the upper body pixels or objects placed between the user and the camera.

In block 202, according to one embodiment, an upper body anthropological measure may be selected to limit the observation likelihood of an upper body component. Anthropological measures M for one or more upper body components may be a set of numerical values that may include but are not limited to means and standard deviations, stored in random access memory or other data storage for a processor-based system. For example, anthropological measures may include dimensions for heads, necks, torsos, arms, etc.

In block 203, in one embodiment, coordinates may be selected for an upper body joint. The joints may be identified between the upper body components, and may include but are not limited to the elbows, shoulders, wrists. For example, the joints may include the neck (N), the left ($S_l$) and right shoulders ($S_r$), elbows and the left ($W_l$) and right wrists ($W_r$). The three coordinates of a joint may be represented with the coordinates J(x), J(y) and J(z).

In block 204, the upper body may be segmented into two or more upper body components and the observation likelihood for each upper body component may be calculated. The probability that each pixel belongs to a certain upper body component may be determined. An optimal set of parameters for a set or all of the observation vectors also may be determined. An optimization algorithm may be used to determine the probability that each foreground pixel represents an upper body component.

In one embodiment, with the assumption that the foreground pixels are independent, $$P(O_F) = \prod_{all ij \in F} P(O_{ij})$$

where $O_F = \{O_{ij}|ij \in F\}$ represents the set of observation vectors corresponding to the foreground pixels. The segmentation of the foreground pixels into the model components involves finding the model parameters M, J that maximize $P(O_F)$. The search for the optimal parameters may be solved by using a set of approximations that may be optimized.

For the set of independent foreground observations, $$P(O_F, Q_F, J, S, M) = \prod_{all\, ij \in F} P(O_{ij}, q_{ij}, J, S, M | \Omega)$$

where $Q_F$ is the sequence of states corresponding to the foreground observation vectors. In one embodiment, the following equation may be used as an approximation for the likelihood of an observation vector:

$$P(O_{ij}) \approx \max_{J,S,M,q_{ij} \in C} P(O_{ij}, q_{ij}, J, S, M)$$

and $$P(O_F) \approx \max_{J,S,M,Q_F} P(O_F, Q_F, J, S, M)$$

The above equation allows computation in logarithmic representation of the observation likelihood of the observation vectors. In one embodiment, where a set of anthropological measures is fixed, and given the fact that parameters of body components are fixed for a set of joints, the initialization problem may be reduced to the following $$\{J, Q_F\} = \arg\max P(O_F, Q_F, J, S)$$

Figure 3:
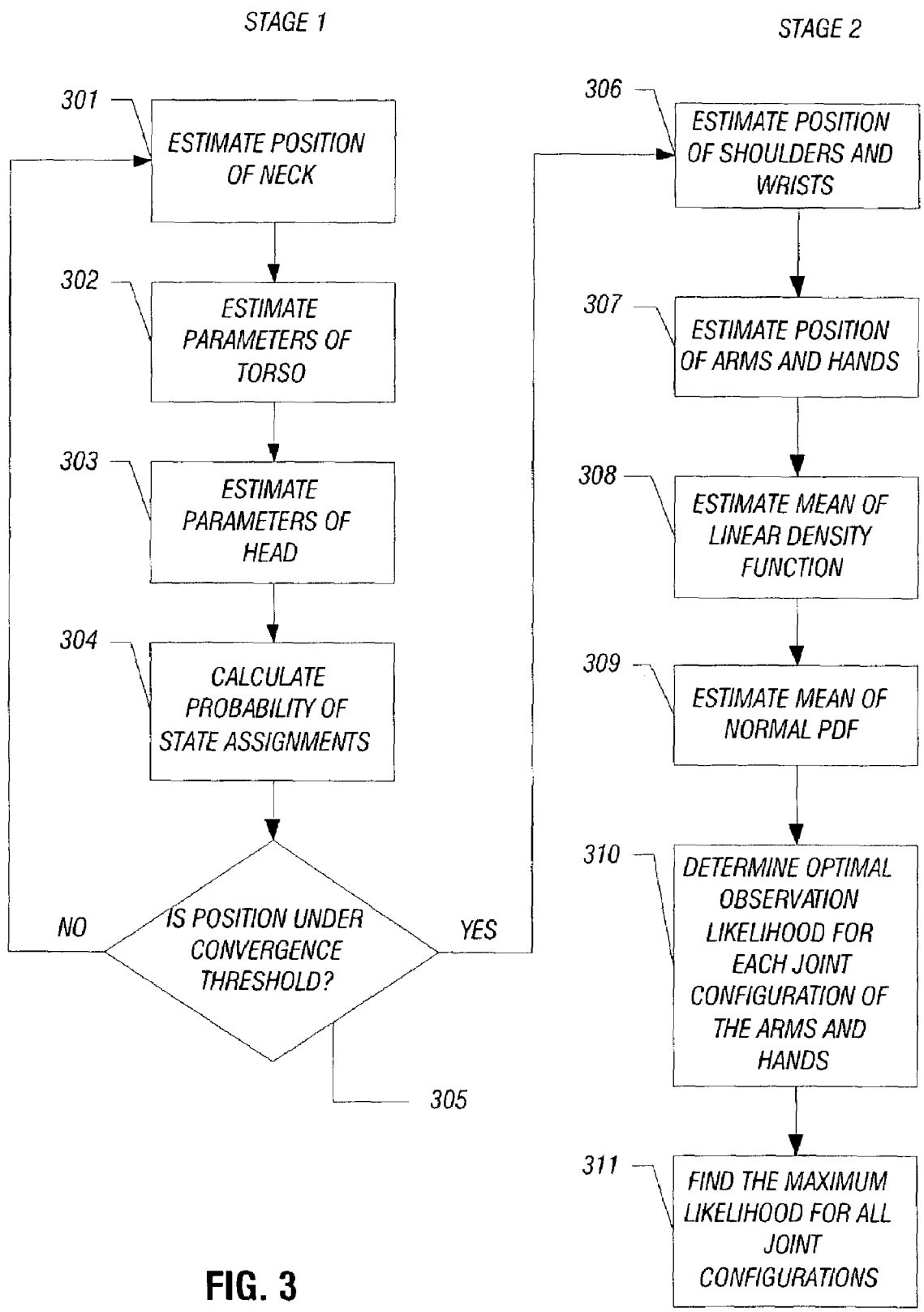
FIG. 3 is a block diagram of a method for detection of upper body components according to one embodiment of the invention.

In the embodiment of FIG. 3, the segmentation and tracking problem may be performed in two stages. Blocks 301–305 represent a first stage of detecting and segmenting the subject's upper body.

The first stage involves searching for the position of an upper body joint, i.e, the neck, and segmenting one or more upper body components, i.e., the head and torso, while treating the remaining upper body components as background. The parameters of the head and torso may be reliably determined because in many images they are represented by a large number of pixels. In the second stage, the search for the position of the remaining joints and for the parameters of the arms and hands is restricted by the values of the parameters found in the first stage.

In the first stage, an initial estimated position of an upper body joint, i.e., the neck, is determined. The probabilities of each pixel being one or other upper body components, i.e., the head and/or the torso, then may be computed. In one embodiment, segmentation of the foreground pixels into upper body components involves finding model parameters that maximize the probability of a given pixel, or observation vector $O_{ij}$, representing a specific upper body component.

In the first stage, the positions of two or more of the upper body components representing the greatest number of pixels, such as the torso and head, may be determined. Typically, the largest upper body components are represented by the greatest number of pixels.

In the first stage, it is assumed that there is only one visible subject in the image. Additionally, it is assumed that the normal to the plane of the largest visible body component, i.e., the torso, is pointing towards the camera. During the first stage, the other remaining upper body components are treated as background.

In block 301, in one embodiment, an initial estimate is made of the parameters of an upper body joint. For example, in one embodiment, the upper body joint is the subject's neck. The initial position of the neck may be estimated by selecting a subset of foreground observation vectors from all of the foreground observation vectors. An initial position of the neck may be estimated by selecting a subset of pixels from the foreground observation vectors in a horizontal plane above the torso, closer to the upper limit of the image. In one embodiment, anthropological measures stored in memory may be used to limit or restrict the subset of pixels which may be assigned to the upper body joint.

In block 302, parameters of a first upper body component may be estimated from a set of foreground observation vectors below the neck plane. In one embodiment, the first upper body component is the subject's torso. In one embodiment, anthropological measures stored in memory may be used to restrict or limit the subset of foreground pixels which may be assigned to the subject's torso. The position of the torso determines, based on the natural structure of the upper body, the regions of search for one or more remaining upper body components of the subject.

In block 303, the parameters of a second upper body component may be estimated. In one embodiment, the observation vectors for the second upper body component may be selected from those foreground observation vectors adjacent the joint and/or the first upper body component. In one embodiment, anthropological measures stored in computer memory may be used to limit or restrict the subset of pixels that may be assigned to the second upper body component. For example, a three dimensional bounding box may be used to help define or limit the parameters of the second upper body component. Parameters of the second upper body component may be estimated from the observation vectors within the bounding box.

In one embodiment, the second upper body component is the subject's head. Stored anthropological measures may be used to define the maximum and/or minimum size of a bounding box for the second upper body component, i.e., the head, thus limiting the pixels which may be assigned to it. In one embodiment, the bounding box and position of the second upper body component may be determined with help of anthropological measures, such as the distance from a joint or first upper body component to the second component. For example, the position of the bounding box for the head may be estimated from the initial position of the torso obtained above.

In block 304, the probability that a set of foreground pixels were correctly assigned to at least two of the largest upper body components may be calculated. In one embodiment, the probability that the foreground pixels were correctly assigned to the subject's torso and head may be calculated. In this embodiment, for example, the probability may be expressed by the following equations:

$$q_{ij} = \underset{q_{ij} \in B}{\arg\max}\, \log P(O_{ij}, q_{ij}, J_B, S_B)$$

and $$\log P(O_F, Q'_F, J_B, S_B) = \sum_{ij \in F} \log P(O_{ij}, q_{ij}, J_B, S_B)$$

where B={He, T}, $J_B$={N, $S_t$, $S_r$}, $Q'_F$ is the sequence of head, torso or background states corresponding to the foreground pixels, and $S_B$ are the parameters of the head, torso and background states.

For the head, $P(O^d_{ij}|q_{ij}=\text{He}, J, S, M) = k_{He}N(O^d_{ij}|\mu_{He}, K_{He})U(\mu_{He}, D_{He})$ where N is a Gaussian density function with mean $\mu_{He}$ and the covariance $K_{He}$, U is a uniform distribution with the same mean, and support $D_{He}$, and $k_{He}$ is a normalization constant. $L_{He}$ is the distance from the neck to the center of the head and $D_{He}$ represents the three axes that describe the head ellipsoid. In addition, $P(J, S, M|q_{ij}=He)=P(\mu_{He}|N, L_{He}q_{ij}=He)P(N)P(L_{He})$ where $P(N)P(L_{He})$=const. and $$P(\mu_{He}|N, L_{He}, q_{ij} = He) = \begin{cases} \frac{1}{4\pi L_{He}}, \text{ if } \|\mu_{He} - N\| = L_F \\ 0, \text{ otherwise} \end{cases}$$

In a similar way we can obtain $P(O_{ij}^d|q_{ij}=Ha_l, J,S, M)$, $P(O_{ij}^d|q_{ij}=Ha_r, J, S, M)$, $P(J,S,M|q_{ij}=Ha_l)$, and $P(J,S, M|q_{ij}=Ha_r)$.

The likelihood of the observation for the torso component $P(O_{ij}^d|q_{ij}=T, J, S, M)$ becomes:

$$P(O_{ij}^d|q_{ij} = T, (a, b, c), \{S_l, S_r\}, D_T) = \begin{cases} k_T II(a, b, c, \sigma^2) N(\mu_T, D_T), \text{ if } O_{ij}^d(y) < \frac{S_l(y) + S_r(y)}{2} \\ 0, \text{ otherwise} \end{cases}$$

where $D_T$ is the width of the torso, N is a Gaussian density function of mean $\mu_T$ and variance $D_T$, $k_T$ is the normalization constant and II is a planar density function defined as $$II(a, b, c, \sigma^2) = \frac{1}{\sqrt{2\pi\sigma_z^2}} \exp\left(-\frac{(z_{ij} - (ax_{ij} + by_{ij} + c))^2}{2\sigma^2}\right)$$

From the above equation, the planar pdf describes a Gaussian distribution with mean $\mu=ax_{ij}+by_{ij}+c$ and variance $\sigma_z^2$. Unlike the Gaussian distribution, the mean $\mu$ for the planar distribution varies depends on the coordinates of the observation vector (i, j).

In block 305, according to one embodiment, it is determined if the observation likelihood of two or more of the largest upper body components is under a selected convergence threshold. The convergence threshold may be measured by the quantitative difference or value of the observation likelihood computed in block 304 and the observation likelihood for one or more earlier iterations. For example, at convergence, $J_B$, $S_B$ represents the best set of joints of the body, and component parameters, and $Q_F$ is the best sequence of states for the head and torso that represents the foreground pixels.

If the position is not under the convergence threshold, blocks 301 to 304 may be repeated. Thus, where $J_B$ represents the neck, its position may be re-estimated until log $P(O_F, Q_F, J_B, S_B)$ at a consecutive iteration falls under a convergence threshold.

In block 301, according to one embodiment, the position of the upper body joint may be re-estimated. For example, if the joint is the subject's neck, the position of the neck may be shifted and re-estimated. In one embodiment, the following set of equations may be used to re-estimate the position of the neck.

$N(x)=\mu_{He}(x)$ $N(y)=\mu_{He}(y)+L_H/2$ $N(z)=aN(x)+bN(y)+c$ $S_l(x)=\mu_T(x)+D_T/2$ $S_l(y)=N(y)$ $S_l(z)=aS_l(x)+bS_l(y)+c$ $S_r(x)=\mu_T(x)-D_T/2$ $S_r(y)=N(y)$ $S_r(z)=aS_r(x)+bS_r(y)+c$ where $\mu T(x)$ is the component along the x axis of the mean of the torso points.

Once the position of the upper body joint is re-estimated in block 301, the positions of the first and second upper body components may be re-estimated by repeating the steps of blocks 302 and 303. The observation likelihood based on the re-estimated position then may be re-calculated in block 304.

Blocks 306–311 represent a second stage of detecting and segmenting the upper body according to one embodiment. In the second stage, the remaining upper body components such as the subject's arms and hands are identified from the remaining foreground pixels not assigned in the first stage. In the second stage, the search for the position of the remaining upper body components may be restricted by the values of the parameters of the upper body components found in the first stage.

In one embodiment, in block 306, possible positions are estimated for a joint or joints associated with the remaining upper body components. For example, possible positions of the shoulders, elbows and/or wrist joints may be estimated. The possible positions of the shoulders, for example, may be estimated based on the position of the torso determined in stage one above. Once a position of the shoulders is selected, possible positions of the elbows and wrists may be estimated. Positions of joints such as the elbow may be limited or restricted by the position of the shoulders, as well as one or more joints and/or body components selected in stage one. In one embodiment, there may be a limited number, i.e., 18, possible positions of a subject's elbows given the position of the neck. Similarly, the positions of the wrists may be limited or restricted by the position of the subject's shoulders, elbows, and/or arms. For example, in one embodiment, there may be a limited number, i.e., 16, possible positions of the subject's wrist given the position of the shoulders, elbows and/or arms.

In block 307, one or more positions of the remaining upper body component(s) may be determined from the remaining foreground observation vectors R. In one embodiment, the position of the remaining upper body components may be limited or restricted by the position(s) of one or more upper body components determined above in the first stage. Anthropological measures stored in memory may be used to limit or define which foreground pixels represent the remaining upper body components.

In one embodiment, the following models may be used for the left and right upper arms and forearms. The density function for the left forearm ($F_l$) is disclosed, while the probability density function (pdf) of the remaining components is similar. The observation likelihood $P(O_{ij}^d|q_{ij}=F_l, J, S, M)$ becomes $$P(O_{ij}^d|q_{ij}=F_l, D_F)=\Lambda(O_{ij}^d|\{v, \kappa, \sigma\})U(\rho_{ij}, D_F)$$

where $D_F$ is the transversal radius of the fore arm, $\rho_{ij}$ is the projection of $O_{ij}$ on the line that connects the left wrist $W_l$ and the left elbow $E_l$ and $\Lambda$ is a linear pdf. A linear pdf is defined as $$\Lambda(O_{ij}^d|\{v, \kappa, \sigma\}) = \frac{1}{\sqrt{2\pi\sigma^2}} \exp\left(-\frac{(O_{ij}^d - \rho_{ij})^2}{2\sigma^2}\right)$$

where $$(O_{ij}^d - \rho_{ij})^2 = \frac{1}{1+v^2+\kappa^2}[(1+\kappa^2)(y_{ij} - vx_{ij})^2 - 2v\kappa(y_{ij} - vx_{ij})(z_{ij} - \kappa x_{ij}) + (1+v^2)(z_{ij} - \kappa x_{ij})^2]$$

and $v$ and $\kappa$ are the line parameters obtained from the joint positions. The joint probability $P(J,S,M|q_{ij}=F_l)=P(\{v, \kappa\}|W_l, E_l, L_F, q_{ij}=F_l)P(W_l|E_l, L_F, q_{ij}=F_l)$ for the fore arm is obtained from $P(L_F|q_{ij}=F_l)=const$, $$P(\{v, \kappa\} \mid W_l, E_l, L_F, q_{ij} = F_l) = \begin{cases} 1, \text{ if } v = \frac{E_y - W_y}{E_x - W_x}, \kappa = \frac{E_z - W_z}{E_x - W_x} \\ 0, \text{ otherwise} \end{cases}$$

$$P(W_l \mid E_l, L_F, q_{ij} = F_l) = \begin{cases} \frac{1}{4\pi L_F}, \text{ if } \|W_l - E_l\| = L_F \\ 0, \text{ otherwise} \end{cases}$$

where $L_F$ is the length of the fore arm. In a similar way are defined $P(E_r|S_r, L_U, q_{ij}=U_r)$, $P(E_l|S_l, L_U, ij=U_r)$, $P(W_r|E_r, L_F, q_{ij}=F_r)$ and $P(O_{ij}^d|q_{ij}=F_r, \{E_r, W_r\}, D_F)$, $P(O_{ij}^d|q_{ij}=U_r, \{S_r, E_r\}, D_U)$, $P(O_{ij}^d|U_l, \{U_l, E_l\}, D_F)$, where $D_U$ and $L_U$ are the transversal radius and the length of the upper arm respectively.

In block 308, according to one embodiment, the mean of a density function may be estimated for the remaining upper body components. In one embodiment, where the position of the subject's arms are determined as remaining upper body components, the mean of a linear density function corresponding to the upper and fore arms are estimated. In block 309, the mean of the same or another density function may be estimated for one or more other remaining upper body components. For example, if the remaining upper body components are the hands, a normal probability density function (pdf) may be used.

In block 310, for each possible joint configuration of the remaining upper body components, i.e., the arms and hands, the best state assignment of the observation vectors R may be determined. In one embodiment, the best state assignment may be determined using the following equation:

$$q_{ij}(J_A, S_A) = \arg\max_{q_{ij} \in A} \log P(O_{ij}, q_{ij}, J_A, S_A)$$

where $A=\{U_l, U_r, F_l, F_r, H_l, H_r\}$ represents the set of body components corresponding to the arms and hands. $Q_R(J_A, S_A)$ may be defined as the sequence of "optimal" states $q_{ij}(J_A, S_A)$, ij $\in$ R for the joint configuration $J_A$ and state components $S_A$. Thus, the "optimal" observation log likelihood $$\log P(O_R, Q_R(J_A, S_A) = \epsilon \log P(O_{ij}, q_{ij}(J_A, S_A), J_A, S_A)$$

where $O_R$ are the sequences of observation vectors, and $Q_R$ are the states corresponding to the foreground pixels not assigned to the head or torso in the first stage of the algorithm.

In block 310, the maximum likelihood of the observation vectors being a specified upper body component is determined over all joint configurations $J_A$. In one embodiment, the following equation may be used.

$$\log P^*(O_R, Q_R(J_A, S_A), J_A, S_A) = \max_{J_A, S_A} \log P(O_R, Q_R(J_A, S_A), J_A, S_A)J_A, S_A$$

In one embodiment, the best set of joints and components corresponding to the best state assignment may be calculated with the following equation.

$$\{J_A^*, S_A^*\} = \arg\max_{J_A, S_A} \log P^*(O_R, Q_R(J_A, S_A), J_A, S_A)J_A, S_A$$

$$Q_R^* = Q_R(J_A^*, S_A^*)$$

After the initial parameters of the upper body are determined, as described above, the parameters of the upper body model may be tracked using the same framework as for the initialization of the parameters of the model. Thus, dynamic gestures may be tracked from a sequence of images. In one embodiment, the tracking may include the following steps. First, obtain the torso and head parameters as well as the position of the joints associated with these components using stage one of the initialization method. In tracking, the initial value of the neck N(y) may be obtained from the previous frame.

Figure 4:
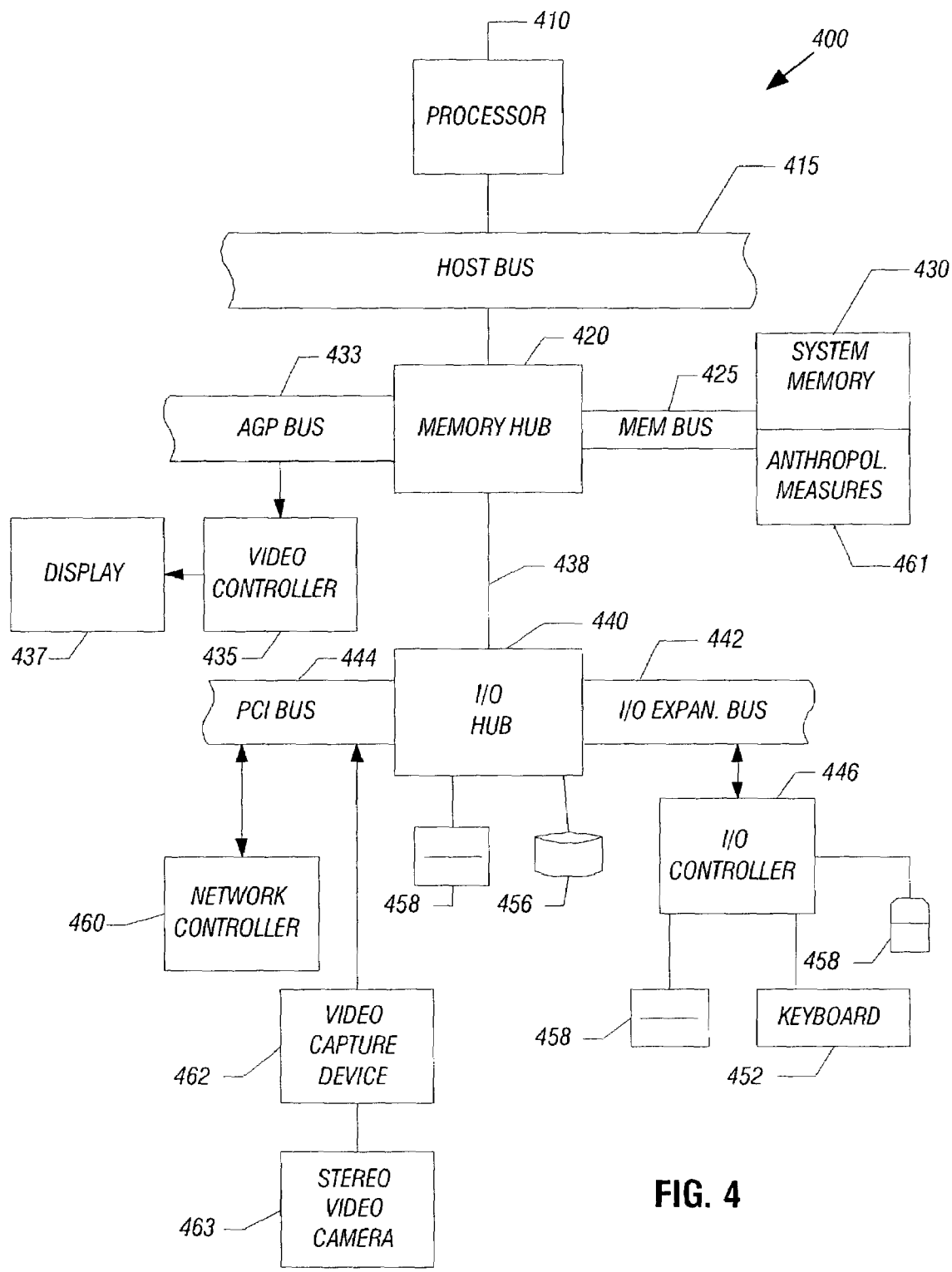
FIG. 4 is a block diagram of an example system according to one embodiment of the invention.

Example embodiments may be implemented in software for execution by a suitable data processing system configured with a suitable combination of hardware devices. FIG. 4 is a block diagram of a representative data processing system, namely computer system 400 with which embodiments of the invention may be used.

Now referring to FIG. 4, in one embodiment, computer system 400 includes processor 410, which may include a general-purpose or special-purpose processor such as a microprocessor, microcontroller, ASIC, a programmable gate array (PGA), and the like. As used herein, the term "computer system" may refer to any type of processor-based system, such as a desktop computer, a server computer, a laptop computer, an appliance or set-top box, or the like.

Processor 410 may be coupled over host bus 415 to memory hub 420 in one embodiment, which may be coupled to system memory 430 via memory bus 425. Anthropological measures 461 may be stored in system memory. Memory hub 420 may also be coupled over Advanced Graphics Port (AGP) bus 433 to video controller 435, which may be coupled to display 437. AGP bus 433 may conform to the Accelerated Graphics Port Interface Specification, Revision 2.0, published May 4, 1998, by Intel Corporation, Santa Clara, Calif.

Memory hub 420 may also be coupled (via hub link 438) to input/output (I/O) hub 440 that is coupled to input/output (I/O) expansion bus 442 and Peripheral Component Interconnect (PCI) bus 444, as defined by the PCI Local Bus Specification, Production Version, Revision 2.1, dated in June 1995. I/O expansion bus 442 may be coupled to I/O controller 446 that controls access to one or more I/O devices. As shown in FIG. 4, these devices may include in one embodiment I/O devices, such as keyboard 452 and mouse 454. I/O hub 440 may also be coupled to, for example, hard disk drive 456 and compact disc (CD) drive 458, as shown in FIG. 4. It is to be understood that other storage media may also be included in the system.

In an alternative embodiment, I/O controller 446 may be integrated into I/O hub 440, as may other control functions. PCI bus 444 may also be coupled to various components including, for example, a stereo digital video input or video capture device 462 and stereo video camera 463. Additionally, network controller 460 may be coupled to a network port (not shown).

Additional devices may be coupled to I/O expansion bus 442 and PCI bus 444, such as an input/output control circuit coupled to a parallel port, serial port, a non-volatile memory, and the like.

Although the description makes reference to specific components of system 400, it is contemplated that numerous modifications and variations of the described and illustrated embodiments may be possible. For example, instead of memory and I/O hubs, a host bridge controller and system bridge controller may provide equivalent functions. In addition, any of a number of bus protocols may be implemented.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   detecting a set of foreground pixels from a plurality of observation vectors obtained from a pair of digital video images, the observation vectors including positional information with respect to a distance from an image capture device and color information, the observation vectors created from a disparity map based on measured differences between the pair of video images, at least some of the foreground pixels representing an upper body;
   selecting an anthropological measure to limit the pixels representing at least one component of the upper body;
   determining the coordinates for at least one joint of the upper body; and
   calculating the observation likelihood of the upper body component from the observation vectors.

2. The method of claim 1 further comprising calculating the observation likelihood for a first, second and third upper body component using a Bayesian network having nodes representing anthropological measures for the first, second and third upper body components, the coordinates for the at least one joint, and parameters of the first, second and third upper body components.

3. The method of claim 2 further comprising estimating the position of the first upper body component from at least some of the foreground pixels, and calculating the observation likelihood of the second and third upper body components based at least in part on the estimated position of the first upper body component, the first upper body component comprising a neck.

4. The method of claim 1 wherein the upper body component is a torso.

5. The method of claim 1 wherein the upper body component is a head.

6. The method of claim 1 further comprising storing the anthropological measures in memory.

7. The method of claim 1 further comprising identifying an upper body gesture.

8. A system comprising:
   a stereo digital video input port to generate a first set and a second set of pixels depicting an upper body; and
   a processor coupled to the stereo digital video input port to create a disparity map from the first set and second set of pixels, and to create a plurality of observation vectors each including positional information with respect to a distance from a stereo camera and color information, the observation vectors created from the disparity map, and to determine the probability that the sets of pixels represent a selected upper body component based on the observation vectors.

9. The system of claim 8 further comprising the stereo camera coupled to the stereo digital video input port.

10. The system of claim 8 further comprising system memory to store a set of anthropological measures.

11. The system of claim 8 wherein the processor is to calculate the probability that the sets of pixels represent a plurality of upper body components using a Bayesian network having nodes to represent anthropological measures for first, second and third upper body components, a position of at least one joint of the upper body, and parameters of the first, second and third upper body components.

12. The system of claim 11 wherein the plurality of upper body components include at least a head and a torso, and a neck, and wherein the probability of the head and the torso is based on the probability of the neck.

13. A processor-based system to:
   detect a set of foreground pixels from a plurality of observation vectors obtained from a pair of video images of an upper body, the observation vectors including positional information with respect to a distance from an image capture device and color information, the observation vectors created from a disparity map based on a measured difference between the pair of video images;
   select an anthropological measure stored in system memory limiting the parameters of an upper body component;
   determine the coordinates for at least one upper body joint from the foreground pixels, the coordinates limited by the anthropological measures; and
   calculate the observation likelihood for the upper body component from the observation vectors.

14. The processor-based system of claim 13 wherein determining the coordinates for at least one upper body joint comprises selecting a plane in the foreground pixels, the normal to the plane facing the upper body.

15. The processor-based system of claim 13 wherein calculating the observation likelihood comprises calculating the observation likelihood for a plurality of upper body components including at least a head, a torso, and a neck, and wherein the probability of the head and the torso is based on the probability of the neck.

16. The method of claim 3, wherein the second and third upper body components comprise a head and a torso.

17. The method of claim 16, further comprising calculating the observation likelihood for an arm and band after the observation likelihood for at least two of the first, second, and third upper body components is less than a convergence threshold.

* * * * *

UNITED STATES PATENT AND TRADEMARK OFFICE
CERTIFICATE OF CORRECTION

PATENT NO. : 7,224,830 B2 Page 1 of 1
APPLICATION NO. : 10/358761
DATED : May 29, 2007
INVENTOR(S) : Ara V. Nefian et al.

It is certified that error appears in the above-identified patent and that said Letters Patent is hereby corrected as shown below:

Column 11:
Line 67, Claim 6, "farther" should be --further--;

Column 12:
Line 62, Claim 17, "band" should be --hand--.

Signed and Sealed this

Fourteenth Day of August, 2007

JON W. DUDAS
*Director of the United States Patent and Trademark Office*